(No Model.)

S. F. LONG.
METALLIC ROD PACKING.

No. 494,817. Patented Apr. 4, 1893.

WITNESSES:
Timothy F. Willard
William _____

INVENTOR
Samuel F. Long
BY
Geo. H. Benjamin
ATTORNEY.

UNITED STATES PATENT OFFICE.

SAMUEL F. LONG, OF PHILADELPHIA, PENNSYLVANIA, ASSIGNOR TO THE UNITED STATES METALLIC PACKING COMPANY, OF PENNSYLVANIA.

METALLIC ROD-PACKING.

SPECIFICATION forming part of Letters Patent No. 494,817, dated April 4, 1893.

Application filed November 4, 1892. Serial No. 450,979. (No model.)

*To all whom it may concern:*

Be it known that I, SAMUEL F. LONG, a citizen of the United States, residing at the city of Philadelphia, county of Philadelphia, and State of Pennsylvania, have invented new and useful Improvements in Metallic Rod-Packing, of which the following is a specification.

My invention relates to metallic rod packing, constructed substantially as shown in Reissued Letters Patent No. 9,365, dated August 31, 1880, and granted to Martin Schneble, that is, so far as the construction of the packing itself is concerned.

Figure 1:
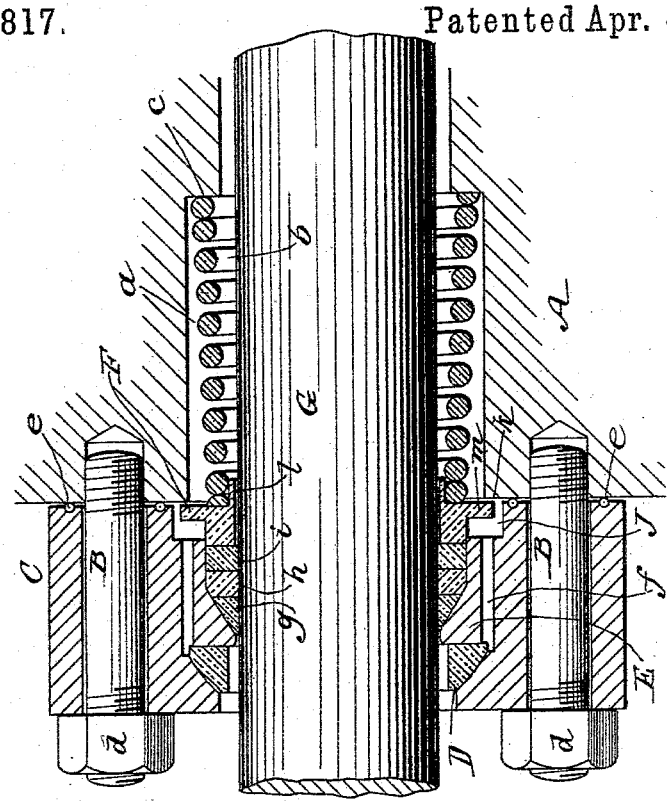
Figure 2:
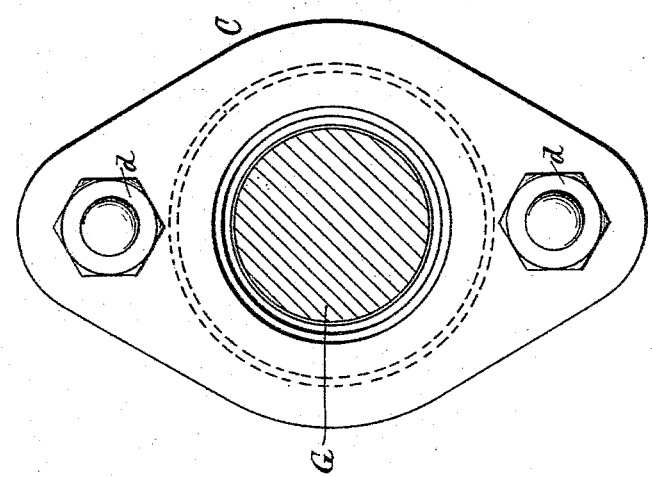

In Figure 2 of the aforesaid patent, there is shown a packing box, the inner face of the cover of which has a concave surface. Within this concave surface is a ring with a convex surface and plain inner surface. Bearing upon this inner surface is a packing receptacle having a plain face and a tapering inner recess, in which are placed packing rings. In Fig. 1 of the patent, there is shown a follower which bears upon the packing rings, being constantly pressed forward by a spring.

With the packing constructed as above stated, it is found that some slight irregularity in the surface of the rod will cause the latter, on its inward stroke, to carry the packing rings and follower so far rearwardly as to permit the follower, by its natural gravital movement, (it being larger than the packing rod,) to take a bearing partially upon the rings and partially upon the packing receptacle, the effect of which is to cant the packing receptacle so that uneven pressure will be made upon the rod and thus cause its rapid wear. Or, the rings may be so far retracted as that when the irregularity of the rod has been worn away, and they are suddenly released and forced into the packing receptacle, by the influence of the steam plus the action of a spring, they will serve to rupture the packing receptacle.

The object of my invention is to provide such a construction as will obviate the above stated objection.

In the accompanying drawings forming part of this specification, Fig. 1 is a longitudinal, sectional view of a packing box embodying my improvements, and Fig. 2, is an end view of the same.

The end wall A, of the piston chamber, is provided with a recess $a$, within which is the tapering coiled spring $b$, the rear coil of which is seated against an annular shoulder $c$, at the inner end of said recess $a$. The face of the wall A, is tapped for the reception of the inner threaded ends of bolts B, B, the outer threaded ends of which engage nuts $d$, $d$, to secure the cover C in position. The rear side of said cover is provided with a pair of circular channels in which bear wire gaskets $e$, $e$, affording, when the bolts are sufficiently tightened, a steam tight bearing for the cover C, against the wall A. Within the cover and adjacent to its forward opening, is a concaved shoulder, against which bears a convexed bearing ring D. Within the cover chamber $f$, and bearing against the rear plain face of the ring D, is a receptacle E, provided with a recess tapered at its forward portion. Within the receptacle E, are packing rings $g$, $h$, $i$, corresponding in shape to that of the recess thereof. The rear portion J, of the cover chamber $f$, is of greater transverse diameter than the recess $a$, in the wall A, so that the latter projects to form a shoulder $k$.

A follower F, is of such size as to closely embrace the rod G, and as shown is provided with a non-essential rear extension $l$, engaged by the forward coil of the expanding spring $b$. The follower extends for a short distance within the receptacle, and under the combined pressure of the spring $b$, and steam admitted to chamber $a$, around the rod, will snugly crowd the packing rings within the receptacle so that they will constitute a steam tight packing for the rod. In addition, the follower pressure will take up and compensate for any wear of the rings within the receptacle. The forward pressure of the follower also serves to normally hold the receptacle in close contact with the rear plain face of the ring D, so that the latter will operate as a ball bearing for the receptacle and rings. It will be seen from the relative dimension of parts illustrated in Fig. 1, that the receptacle is capable of a free movement in all directions within the cover chamber. This capability, in connection with the ball bearing ring admits of the packing rings and receptacle automatically adjusting themselves to any deviation in the stroke alignment of the rod, caused by wear or otherwise.

When any surface variation of the rod tends to carry the packing ring backward, and unseat the receptacles relative to the ring D, a lateral flange m, of the follower, extending into the enlarged portion J, of the cover recess is adapted to contact with the shoulder k, and then disengage the rings from the rod and enable the latter to continue its rearward movement unaccompanied by said rings. Thus I avoid the undue compression of the follower spring, and sudden release of the parts so objectionable as before mentioned.

An important feature of my invention consists in the fact that the size and movement of the lateral flange m, of the follower are such, that the play of the said follower is confined solely to the recess of the ring receptacle. Such an arrangement insures the constant pressing action of the follower by the packing rings, and prevents the former from moving beneath the end edge of the receptacle, in which position, as will be readily appreciated, the function of the follower would be suspended and all the parts liable to become damaged. Further, the close engagement of the follower with the rod prevents the former from leaving the receptacle by being canted, as it would be if there were any transverse play of the follower on the rod.

To make the advantages of this packing more obvious, I state that by providing the follower F, with the lateral flange m, which always prevents movement or unseating of the follower from the packing receptacle, it is not necessary to rely upon the follower pressing spring for this purpose. Furthermore, when a spring is relied upon to compress a packing by a follower, the action of heat from the engine cylinder or valve chest on one side portion of the spring and of cooling atmospheric influences on its other side portion gives the spring an unequal temper causing it to press unevenly at opposite sides of a follower, and should the follower be allowed to move out of the packing receptacle, the spring under such conditions would by unequal pressure on the follower, tend to throw it to one side and seat it improperly on the packing rings or on them and their receptacle, and either break or damage the parts.

It is well known that difficulty is experienced in producing Babbitt or other metallic packing rings having like degree of hardness throughout. Hence such rings wear unevenly, and this feature alone promotes a tilting tendency and irregular action of the rings when in use, but by providing with such packing rings a follower, which in operation never can leave the ring receptacle, as in my invention, this lack of homogeneity and uneven wear of the rings is not a material disadvantage and the packing will remain effective and tight, and the follower will be uninjured until the packing is completely worn out.

A further advantage of my improvement, aside from the compact and inexpensive construction of the parts, is that the follower is not only prevented from leaving the packing ring receptacle, but the entire packing including the bearing ring, the receptacle and the packing rings within the latter, have very little play lengthwise of or along the piston rod or valve stem, or only so much as may be needed to allow rocking of the bearing ring on its seat to accommodate non-alignment or lateral motion of the rod or stem. Hence there can be no relative disarrangement of the parts of the packing to allow one part to override another or to receive undue share of resistance or wear, and these advantages are not secured in a packing with which a variable tension spring is alone relied on to maintain the parts in proper relative positions.

It will also be obvious that with my packing, having a rocking bearing ring, a receptacle carrying packing rings, and a follower which does not leave the packing ring receptacle, a spring is not essential to successful working, but such spring is an advantage, as it prevents undue looseness and noisy action of the parts.

I claim—

1. In a metallic rod packing of the character described, the combination with the piston chamber and the rod reciprocating therein, of a cap or cover having a concaved bearing shoulder, a bearing ring fitting said shoulder, a receptacle next said bearing ring, packing rings within the receptacle, and a follower within the receptacle behind the rings and provided with an abutting flange or part, whereby it is made operatively incapable of movement from the receptacle, substantially as described.

2. In a metallic rod packing of the character described, the combination, with the piston chamber and the rod reciprocating therein, of the cap or cover having an interior chamber and a concaved bearing shoulder, a bearing ring fitting said shoulder, a receptacle next said bearing ring, packing rings within the receptacle, and a spring actuated follower within the receptacle pressing the packing rings and provided with an abutting flange or part, whereby it is made operatively incapable of movement from the receptacle, substantially as set forth.

3. In a metallic rod packing, the combination with a piston chamber, a rod movable therein, and a cap or cover C having an interior chamber f, and a concaved shoulder of a bearing ring D fitted to said concaved shoulder, a receptacle E next the ring D, packing rings as $g$, $h$, $i$, within the receptacle, and a spring pressed follower F bearing on the packing rings and provided with a stop flange $m$, preventing excessive inward movement of the parts $g$, $h$, $i$, E, D; said follower being operatively incapable of movement from the interior chamber of the packing ring receptacle, substantially as described.

In testimony whereof I affix my signature in the presence of two witnesses.

SAMUEL F. LONG.

Witnesses:
 L. L. DREW,
 T. R. HILL.